United States Patent Office 2,722,749
Patented Nov. 8, 1955

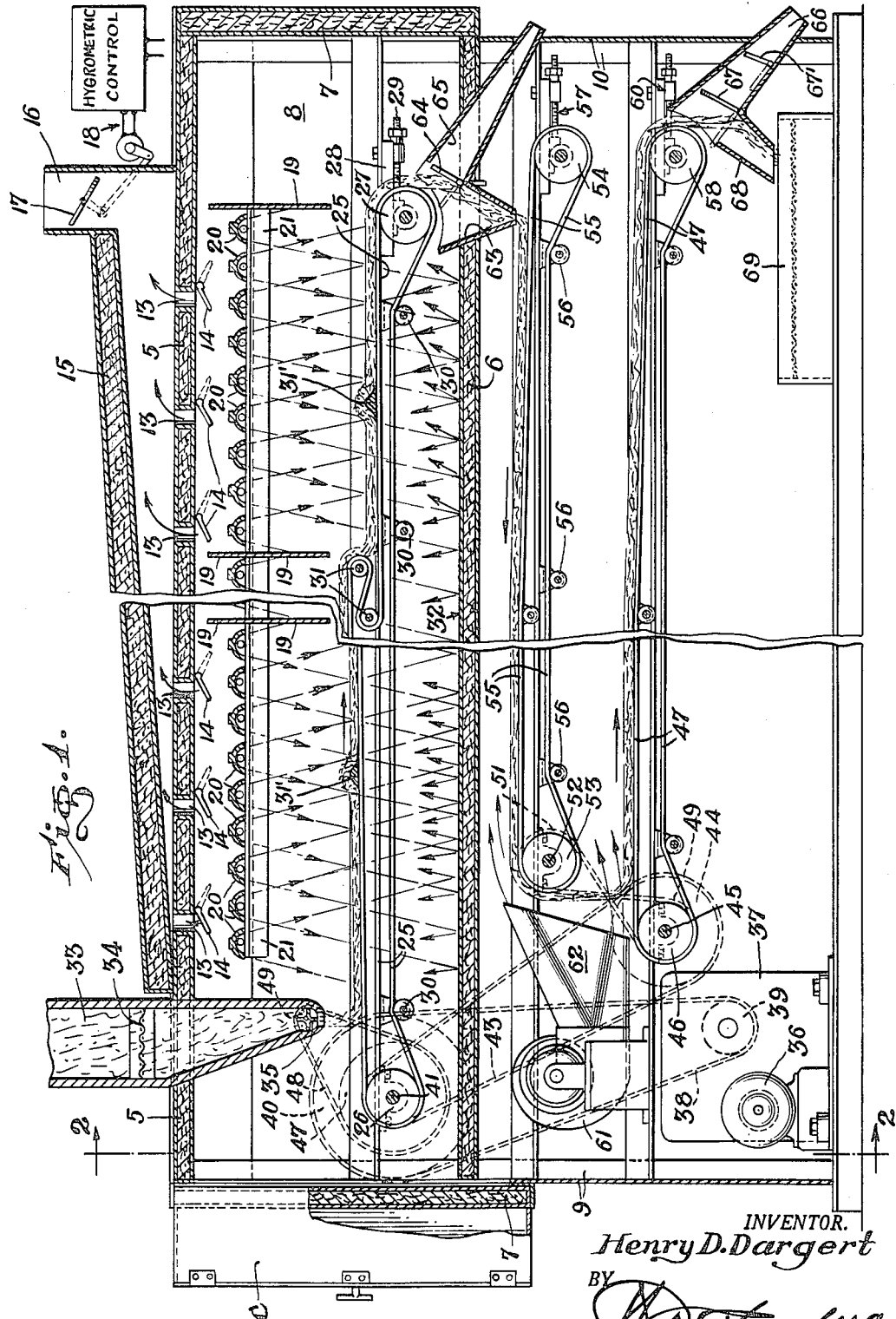

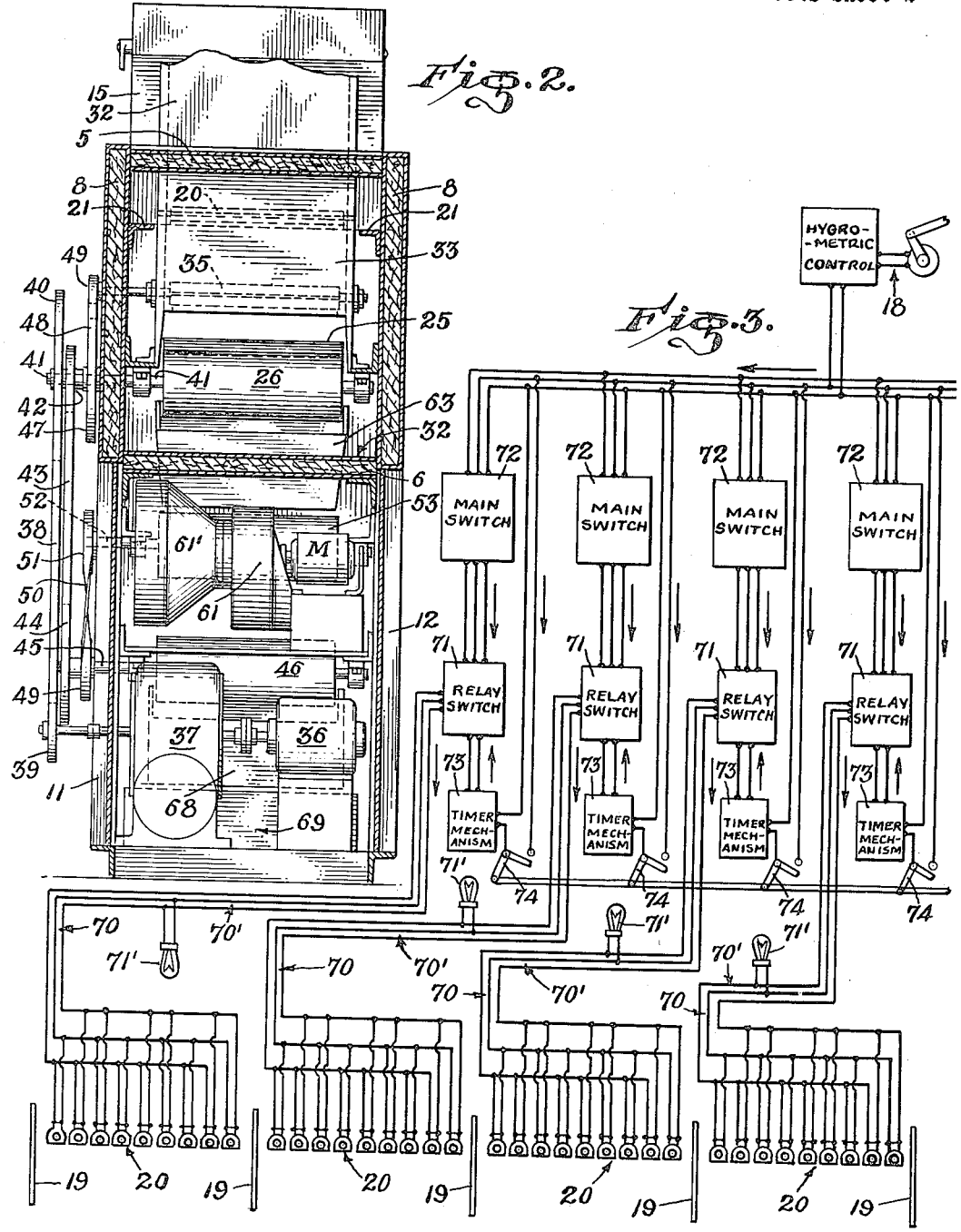

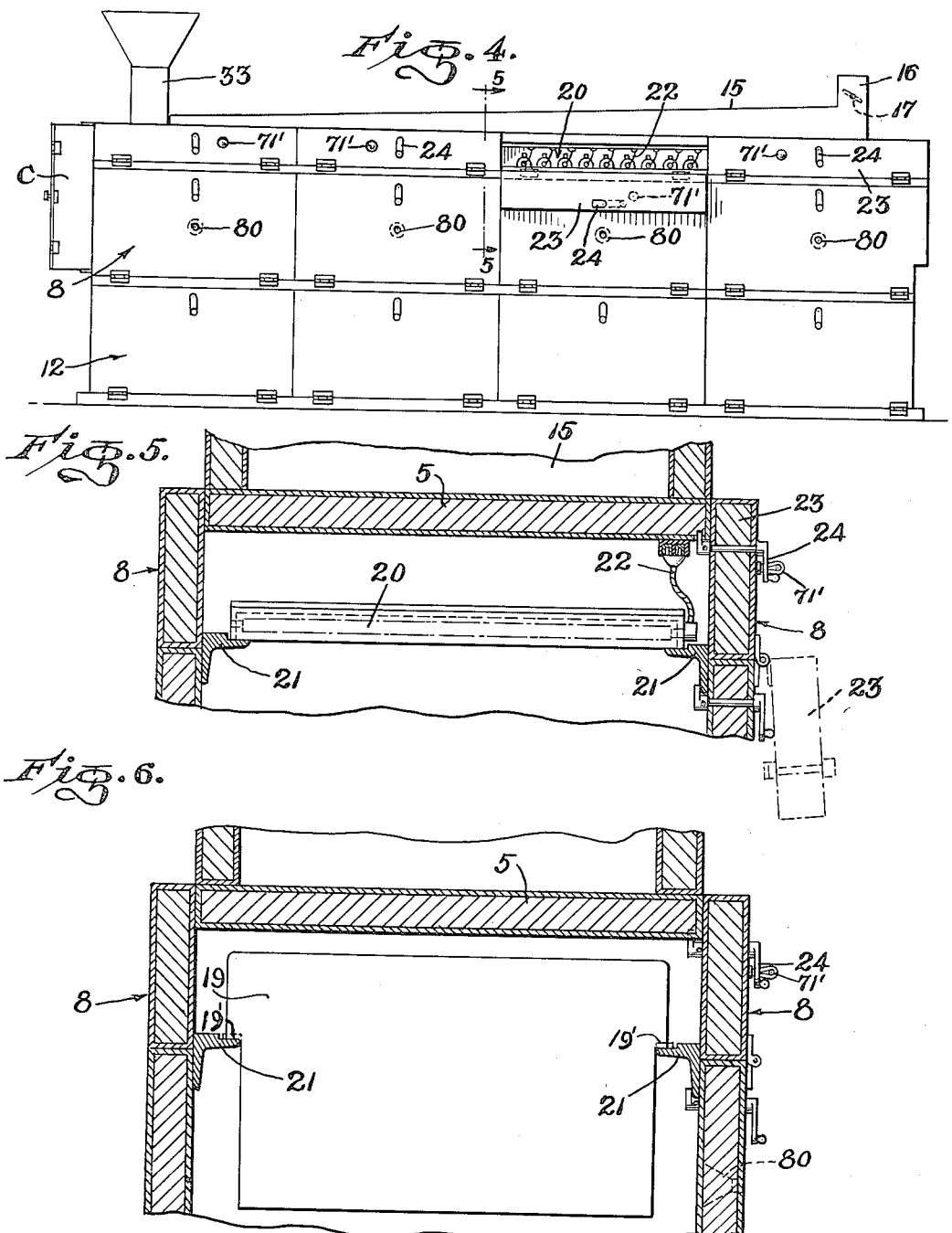

2,722,749

APPARATUS FOR TREATING FOOD ITEMS WITH RADIANT HEAT

Henry D. Dargert, Huntington Park, Calif.

Application June 21, 1951, Serial No. 232,756

7 Claims. (Cl. 34—44)

This invention relates to apparatus for treating food items with radiant heat, and more particularly to a new and improved apparatus for dehydrating food items of many kinds including vegetables, fruits, meats, salts, and many others.

Among the salient objects of the invention are:

To provide a unitary machine or apparatus which is capable of performing all of the operations involved in thus treating food items, instead of the usual plurality or separate pieces of equipment, such as a rogger for removing the rag from fruit peel, sizer for cutting it in the desired sizes for the particular type of processing, spreader, oven, classifier, weighing and bagging or packing apparatus.

In the processing of vegetables, fruit and animal matter, it is important that the removal of moisture begin from the interior or center of the product rather than from the outer surface. In baking bread, if the moisture is removed from the surface first, it bakes hard or "case hardens" before the moisture is removed from the inside.

In general practice the material is steamed in a separate unit before being subjected to dehydration so that the surface is more penetrable than it naturally would be.

In the present invention, through the use of proper heat controls, insulation and proper proportionate ventilation, the material is not only charged with a far higher percentage of heat input than is usually possible, but the steam or vapor generated in the drying process is regulated in the chamber so as to keep the humidity of the chamber at the proper temperature to prevent the case hardening of the materials by performing the operation of the steamer in keeping the outside of the material moist while the inside is being brought to the proper temperature to remove the moisture as rapidly as may be advisable for proper retention of vital food elements.

Other objects and advantages of the present invention will be brought out in connection with the more detailed description of one practical embodiment of the invention, taken with the accompanying 3 sheets of drawings, in which:

Figure 1 is a vertical longitudinal sectional view through an apparatus embodying my invention;

Figure 2 is a vertical transverse sectional view through said apparatus, taken on line 2—2 on Fig. 1;

Figure 3 is a diagrammatic view of the wiring and control mechanism;

Figure 4 is a side elevation of a machine embodying the invention, showing the doors, through which access to the interior is made conveniently possible, one door being shown open to expose the heaters;

Figure 5 is a fragmentary sectional view taken on line 5—5 on Fig. 4; and

Figure 6 is a fragmentary cross sectional view showing how the partition or baffle members are adjustably supported.

Referring in general to the drawings, the housing for the invention will be understood from Figs. 1, 2 and 4, to be of rectangular form, and that it can be of any desired length, width and height, in substantially the proportions indicated by the showing on said drawings.

Referring more in detail to the drawings, the upper housing or chamber has the top and bottom, insulating walls, 5 and 6, the end walls 7 and 7, and the side walls 8, 8. It is supported on a supporting structure having the end walls 9 and 10, and the side walls 11 and 12, forming a lower chamber in which the power mechanism and some of the carrying belts are shown, and again referred to. This supporting structure is indicated as being made of angle iron, but can be made of any suitable material.

The top wall 5 is provided with ventilating openings, as 13, with control dampers 14, therefor, opening into a chamber formed by an inclined top wall 15, having an outlet flue 16, with damper 17 therein, and with a hygrometric control mechanism 18 therefor, as indicated.

Mounted in said upper chamber are a series of baffle members or cross wall members, as 19, 19, each having upper corner extensions, as 19', by means of which they are supported, and can be adjusted or moved to different positions lengthwise of the chamber, along supporting brackets 21, 21, as seen in Fig. 6. The number of these partitions will depend on the length of said chamber. In Fig. 1 the central portion of the view is broken away to reduce the size of the figure.

Mounted in said upper chamber are a series of radiant heaters, as 20, 20, one of which is shown in enlarged view in Fig. 5, supported at its opposite ends upon two brackets, as 21, 21, on which the partitions 19 are supported, as before described. These supporting brackets are at the opposite sides of the housing, with an individual electric connection therefor, as at 22, Fig. 5. A door, designated 23, has a crank latch 24, for holding it closed, as indicated in Fig. 5, said door being shown in open position in Fig. 4, and also in Fig. 5, in light broken lines. It will be understood, of course, that any suitable structural arrangement can be used for giving access to said heaters, and the other mechanism in said housing, and which make it easy to replace them when necessary.

Mounted in said upper chamber, to run lengthwise thereof, is an endless carrier belt 25, running over a driving drum 26 at the left end, as here shown, and over another drum 27, at the right hand end, as shown, said drum 27 being mounted for adjustment, as indicated, by an adjustment support 28, with an adjustment screw, as 29, whereby the tension of said carrier belt can be regulated. Supporting rollers, as 30, 30, are shown under said belt to hold the lower lap in closer relationship to the upper lap thereof. A couple of closely spaced rollers, as 31, 31, are shown interposed in the upper lap of said belt 25, where the belt is turned back under itself a short distance, whereby the material carried on said belt will be dumped from the upper part of the belt to the lower part thereof, thus tumbling the material as it falls from one level to the other, as will be understood from Fig. 1, at the guide rollers 31, 31.

As another means for stirring or agitating the material on the endless carrier belt 25, two cross strips, as 31', are shown immediately over the upper lap of said belt, extending from one side of the machine to the other, flatwise on said belt, as shown, and tapered so that the material on the belt, as it moves along on the belt is pushed or moved up over said agitating cross strips 31', as indicated in two places in Fig. 1. Any number of these agitating strips can be used.

The upper or carrying lap of said carrier belt, it will be noted, is positioned under the line of radiant heaters or lamps 20, 20, showing by the line arrows how the light rays or heat rays are directed on to said belt and the material thereon, and also how said rays are reflected upwardly after striking a reflecting surface 32.

The material to be processed is fed to the machine through a hopper like structure, designated 33, having therein a screening member 34, and at its lower end it is reduced by a suitable taper and provided with a rotatable feeder 35. This hopper feed is understood to be of substantially the width of the carrier belt so as to discharge the material evenly and across said belt, as said feeder 35 is revolved, and again referred to.

Referring to the motor 36, and the reduction transmission box 37, a drive belt 38 from a pulley 39, is extended to a large pulley 40, on shaft 41, on which the belt drive drum 26 is mounted. On said shaft 41, inside said large pulley 40, is a smaller pulley 42, on which runs a belt 43, Fig. 2, extended down and around a pulley 44, on a shaft 45, on which another belt drum 46 is mounted, and again referred to. On the upper shaft 41, next to the housing wall 8, is a pulley 47, from which runs a belt 48 to a pulley 49 on the feeder 35, in the tapered end of the feed hopper, as will be understood from Figs. 1 and 2.

On shaft 45 is a pulley 49, Fig. 2, from which runs a belt 50 upwardly to a pulley 51, on a shaft 52, on which is also a belt drum 53 to be driven thereby.

From belt drum 53 to a belt drum 54 at the opposite end of the machine, is another endless belt 55, the lower lap of which is supported by supporting rollers, as 56, 56. The belt drum 54 is also mounted for adjustment by mechanisms designated 57, as indicated on Fig. 1.

From the belt drum 46, on shaft 45, runs a belt 47 to another belt drum 58, at the right hand end of the structure, as shown, also mounted for adjustment, as at 60.

The top lap of the carrier belt 55, it will be noted is indicated by the arrow as traveling to the left, while the top lap of the lower belt 47 is indicated as traveling to the right.

Mounted in the lower housing of said structure, to the left of said carrier belts 47 and 55, is a fan or blower, designated 61, having its discharge opening or nozzle directed toward said carrier belts as shown in Fig. 1, discharging air as indicated by the arrows along said carrier belts. Said fan or blower 61, as seen in Fig. 2, has its own motor M, and is also provided with an intake funnel, as 61', to facilitate the intake capacity of said fan or blower.

A receiving and feeding hopper-like member 63 is shown at the right hand end of the carrier belt 25 in the upper housing, and into which material carried by said belt is discharged, as indicated at 63, said hopper-like member 63 having a damper 64, at its upper outer edge, which can be turned inwardly, as indicated in light broken lines, for the purpose of directing the material from said carrier belt 25, into a discharge spout 65, leading outside of the housing, as indicated. With said damper 64 in the position shown in full lines, the material from said carrier belt 25 falls into said hopper-like member 63, and from which it is fed on to the lower belt 55, as shown, and is carried to the left, toward the fan, and receives the air discharged therefrom, as indicated by the arrows.

At the left end of said carrier belt 55, the material being moved thereon to the left, is allowed to fall down to the lower belt 47, and to be carried back to the right, as indicated, where it is discharged into another hopper-like member 66, leading out through the structure, as indicated. Said hopper-like member 66 has a damper 67, which can be raised, as shown in full lines, for directing the material through a short spout 68, and into a screening or classifying box, as indicated, designated 69. It also has a stop-flow damper, as 67' to be used to momentarily check discharge from said spout 65.

It will be understood, of course, that the showing made here is only illustrative of the general construction and arrangement, and that the drive connections can be either belts running over pulleys, or could be sprocket chains running over sprocket wheels.

It will also be understood that as the material is dropped on the belt, from one level to another, as at the belt lap at 31, 31, the material is tumbled and turned over and thus more thoroughly mixed. This is also true as the material falls from belt 25 to the hopper-like member 63 and then on to the other belt 55, going in the opposite direction, and also when the material falls down to the lower belt 47 and is carried to the right and to the hopper or discharge 66. The speed of the carrier belts, will of course, be regulated for the best results. At the left end of the housing, is a cabinet, as C in which the electric and control mechanisms are housed.

On Fig. 3, I have indicated by a diagrammatic view, one system of wiring and switch control, showing the heaters or lamps 20 in four different banks or groups, and each being connected through its wires, as 70, through a relay switch, as 71, and through a main switch 72, with a timer mechanism 73, which operates a control switch, as at 74. These are, of course, standard mechanisms. Each group of heaters is shown with the same control switches and mechanisms, which are all contained in the control cabinet C.

The control of the damper 17, in the ventilating stack 16, Fig. 1, as indicated, is automatically controlled by means of a hygrometric control mechanism with lever connections, as at 18, Fig. 1.

Referring to Fig. 4, I have shown inspection openings, designated 80, and in these can be placed known devices to make the inspection of the interior more extensive from a small opening.

I have also indicated signal lights, or lamps, as 71', 71' along the outside of the housing, and connected them into the circuit to the heaters, as indicated in Fig. 3, where these lamps 71' are shown connected in the circuits 70'. These signal lights will indicate that the mechanism is operating.

While I have shown and described one practical embodiment of the invention, I am aware that changes in the details of construction and arrangement can be made therein without departing from the spirit of the invention, and I do not, therefore, limit my invention to the showing for descriptive purposes, except as I may be limited by the hereto appended claims.

I claim:

1. A device for treating food items with radiant heat comprising: a housing forming a substantially gas-tight heating chamber, means for partitioning said heating chamber into separate sections along the length thereof, radiant heating members mounted in each of said sections, means for controlling the output of the radiant heating members in each section to control the temperature and humidity in each of said sections, a carrier belt for holding and moving food items under said radiant heating members and through said sections, a vent in each section of said heating chamber, and damper means for controlling exhaust through each said vents.

2. The combination set forth in claim 1, wherein said belt is folded back over itself in at least one of said sections to tumble and agitate food items during passage through said heating chamber.

3. A device for treating food items with radiant heat comprising: a housing forming a substantially gas-tight heating chamber, means for partitioning said heating chamber into separate sections, radiant heating members in each of said sections, means for controlling the output of each radiant heating member to control the temperature and humidity in each of said sections, a carrier belt for holding and moving food items under said radiant heating members, a vent in each section of said heating chamber, damper means controlling exhaust through said vents, an exhaust chamber above said heating chamber into which said vents discharge and a hygrometric controlled baffle controlling exhaust from said exhaust chamber.

4. The combination set forth in claim 1 wherein an exhaust chamber is provided above said heating chamber into which said vents discharge, and wherein baffle means are provided for controlling exhaust from said exhaust chamber.

5. The combination set forth in claim 1 wherein said carrier belt is impervious to moisture.

6. A device for treating food items with radiant heat, comprising: a housing forming a substantially gas-tight heating chamber, a series of radiant heating members mounted within said heating chamber for directing radiant heat rays on said food items on said belt, control means for regulating the output of said radiant heating members, damper-controlled vent means in the ceiling of said heating chamber for permitting natural draft movement of air therethrough into a separately enclosed upper chamber, and a hygrometrically-controlled baffle controlling exhaust from said upper chamber.

7. A device for treating food items with radiant heat, comprising: a housing forming a substantially gas-tight heating chamber, means for holding food items in said heating chamber, radiant heating means mounted within said heating chamber for directing radiant heat rays on said food items, means defining an enclosed upper chamber above said heating chamber, vent means between said heating chamber and said upper chamber, and hygrometrically-controlled means for controlling exhaust from said upper chamber.

References Cited in the file of this patent

UNITED STATES PATENTS

| | | |
|---|---|---|
| 525,572 | Andrae | Sept. 4, 1894 |
| 877,942 | McCarthy | Feb. 4, 1908 |
| 1,520,187 | Lawson | Dec. 23, 1924 |
| 1,645,695 | Forrest | Oct. 18, 1927 |
| 2,270,111 | Daley | Jan. 13, 1942 |
| 2,308,239 | Bell | Jan. 12, 1943 |
| 2,391,441 | Baer | Dec. 25, 1945 |
| 2,419,875 | Birdseye | Apr. 29, 1947 |
| 2,419,876 | Birdseye | Apr. 29, 1947 |
| 2,445,443 | Long | July 20, 1948 |
| 2,446,822 | Grapp | Aug. 10, 1948 |
| 2,450,590 | Gullo | Oct. 5, 1948 |
| 2,452,983 | Birdseye | Nov. 2, 1948 |
| 2,559,713 | Dunski et al. | July 10, 1951 |

FOREIGN PATENTS

| | | |
|---|---|---|
| 489,616 | France | Oct. 15, 1918 |

OTHER REFERENCES

Drying by Infra-Red Radiation, by Shuman et al.; Food Technology, pages 481 to 484, December 1951.